(12) United States Patent
Hoover et al.

(10) Patent No.: US 11,767,905 B2
(45) Date of Patent: Sep. 26, 2023

(54) LAMINATED RACK ASSEMBLY FOR POWERED MOTION OF AIRCRAFT SEATS

(71) Applicant: AMI Industries, Inc., Colorado Springs, CO (US)

(72) Inventors: Douglas E. Hoover, Colorado Springs, CO (US); Keith M. Ferguson, Colorado Springs, CO (US)

(73) Assignee: AMI Industries, Inc., Colorado Springs, CO (US)

( * ) Notice: Subject to any disclaimer, the term of this patent is extended or adjusted under 35 U.S.C. 154(b) by 441 days.

(21) Appl. No.: 16/988,392

(22) Filed: Aug. 7, 2020

(65) Prior Publication Data

US 2022/0042589 A1 Feb. 10, 2022

(51) Int. Cl.
| | | |
|---|---|---|
| *F16H 55/26* | (2006.01) | |
| *F16H 19/04* | (2006.01) | |
| *B64D 11/06* | (2006.01) | |
| *B32B 15/01* | (2006.01) | |
| *B32B 3/02* | (2006.01) | |
| *B23F 17/00* | (2006.01) | |
| *B32B 3/26* | (2006.01) | |

(52) U.S. Cl.
CPC ............ *F16H 55/26* (2013.01); *B23F 17/006* (2013.01); *B32B 3/02* (2013.01); *B32B 3/266* (2013.01); *B32B 15/012* (2013.01); *B64D 11/0639* (2014.12); *B64D 11/0648* (2014.12); *B64D 11/0649* (2014.12); *F16H 19/04* (2013.01); *B32B 2605/18* (2013.01); *F16H 2712/06* (2013.01)

(58) Field of Classification Search
CPC .......... F16H 55/26; F16H 55/28; F16H 19/04; B64D 11/0648
See application file for complete search history.

(56) References Cited

U.S. PATENT DOCUMENTS

| | | | |
|---|---|---|---|
| 2,821,014 A | | 1/1958 | Miller |
| 3,225,616 A | * | 12/1965 | Whitehead .............. F16H 55/12 74/448 |
| 4,522,080 A | * | 6/1985 | Santi ..................... F16H 53/025 29/893.2 |
| 5,337,626 A | * | 8/1994 | Everts ..................... F16H 55/12 74/445 |
| 6,451,447 B1 | | 9/2002 | Ragland et al. |
| 8,231,097 B2 | * | 7/2012 | Pinkal ................ B64D 11/0696 248/500 |

(Continued)

FOREIGN PATENT DOCUMENTS

| | | |
|---|---|---|
| CN | 201187133 Y | 1/2009 |
| CN | 101417387 A | 4/2009 |

(Continued)

*Primary Examiner* — Gregory Robert Weber
(74) *Attorney, Agent, or Firm* — Suiter Swantz pc llo

(57) ABSTRACT

A rack is made from a plurality of laminated layers. Each layer defines an alignment feature that allows all of the layers to be affixed to a base plate of an aircraft seat assembly and align the teeth of the rack to within five ten-thousandths of an inch. The rack includes a straight portion and a curved portion such that a pinion gear on the aircraft seat assembly can move the aircraft seat assembly along tracks with straight and curved portions.

10 Claims, 6 Drawing Sheets

(56) References Cited

U.S. PATENT DOCUMENTS

| | | | |
|---|---|---|---|
| 8,360,336 B2* | 1/2013 | Luckett | F16H 55/26 |
| | | | 238/123 |
| 9,518,645 B2* | 12/2016 | McCombs | B21D 22/14 |
| 9,827,737 B2 | 11/2017 | Selyugin et al. | |
| 9,889,633 B2* | 2/2018 | Miller | B32B 15/015 |
| 10,112,373 B2 | 10/2018 | Griess et al. | |
| 10,118,645 B2 | 11/2018 | Von Watzdorf et al. | |
| 10,450,071 B2* | 10/2019 | Jones | B64D 11/06395 |
| 10,605,347 B2* | 3/2020 | Larson | F16H 57/0025 |
| 2004/0058181 A1 | 3/2004 | Garnault et al. | |
| 2004/0096674 A1 | 5/2004 | Hansson | |
| 2004/0115463 A1 | 6/2004 | Sibum | |
| 2015/0018150 A1* | 1/2015 | Cowen | F16H 57/05 |
| | | | 474/152 |
| 2017/0080671 A1 | 3/2017 | Gunnink et al. | |
| 2017/0292597 A1* | 10/2017 | Kurek | F16H 55/12 |
| 2017/0341181 A1 | 11/2017 | Amtmann et al. | |
| 2018/0216247 A1 | 8/2018 | Chang et al. | |
| 2019/0353204 A1 | 11/2019 | Podbielski et al. | |
| 2022/0135233 A1* | 5/2022 | Cheron | B60N 2/0737 |
| | | | 248/429 |

FOREIGN PATENT DOCUMENTS

| | | | |
|---|---|---|---|
| CN | 101966766 A | | 2/2011 |
| CN | 105042032 A | * | 11/2015 |
| CN | 109454952 A | | 3/2019 |
| CN | 110030364 A | | 7/2019 |
| DE | 102016013466 A1 | | 5/2017 |
| DE | 102015015388 A1 | | 6/2017 |
| DE | 102015121951 A1 | | 6/2017 |
| TW | I401156 B1 | | 7/2013 |
| WO | 2019057235 A1 | | 3/2019 |
| WO | 2019086146 A1 | | 5/2019 |

* cited by examiner

US 11,767,905 B2

LAMINATED RACK ASSEMBLY FOR POWERED MOTION OF AIRCRAFT SEATS

BACKGROUND

There is a growing need for lower cost and lighter weight means of producing drive components for powered motion in aircraft seats. A typical rack and pinion execution to provide motion tends to be heavy and expensive.

SUMMARY

In one aspect, embodiments of the inventive concepts disclosed herein are directed to a rack having a plurality of laminated layers. Each layer defines an alignment feature that allows all of the layers to be affixed to a base plate of an aircraft seat assembly and align the teeth of the rack to within 0.0127 millimeters (five ten-thousandths of an inch).

In a further aspect, the rack includes a straight portion and a curved portion such that a pinion gear on the aircraft seat assembly can move the aircraft seat assembly along tracks with a curved portion.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1A:
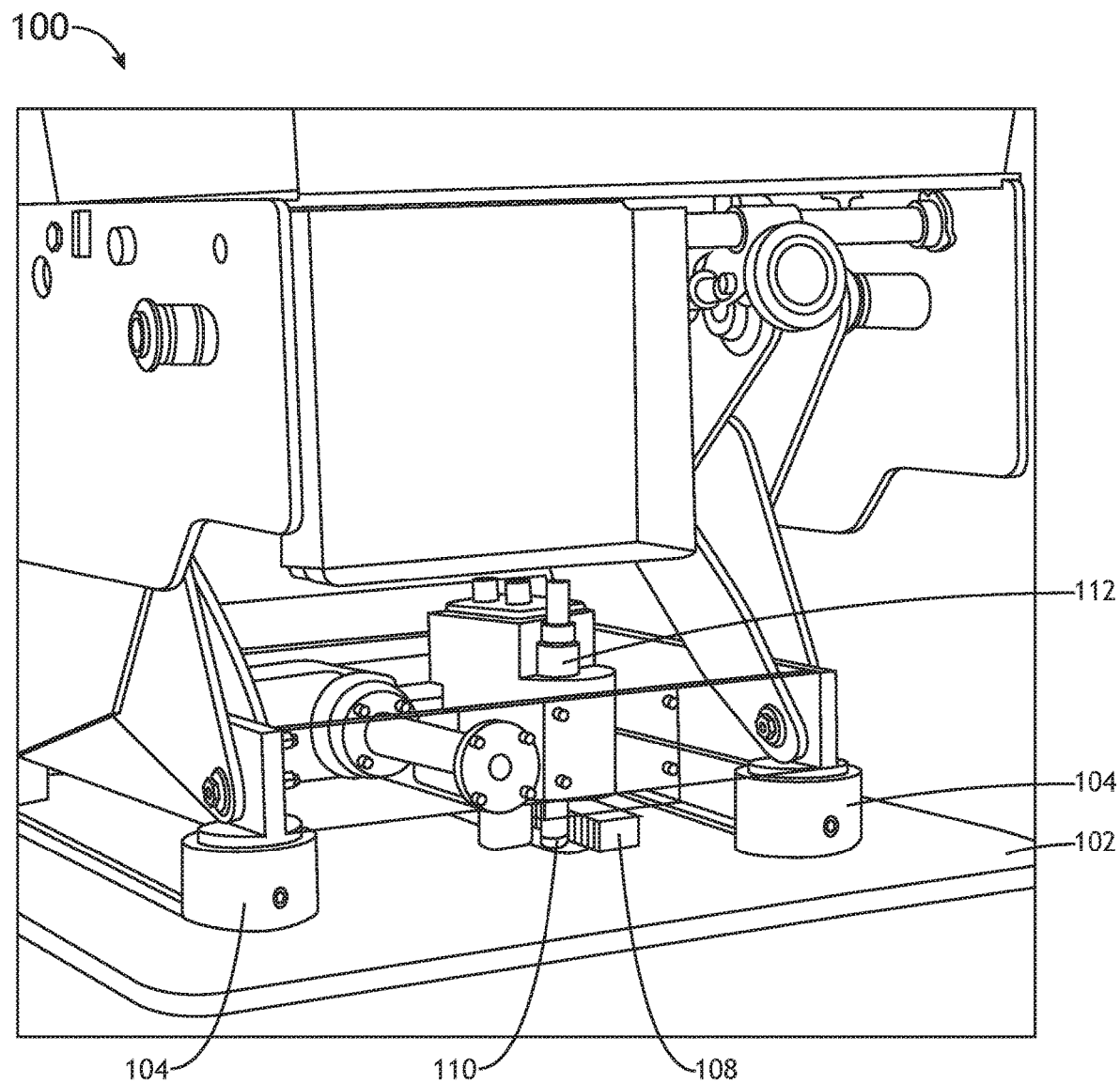
FIG. 1A shows a perspective environmental view of an aircraft seat assembly including a rack according to an exemplary embodiment.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a rack having a plurality of laminated layers. Each layer defines an alignment feature that allows all of the layers to be affixed to a base plate of an aircraft seat assembly and align the teeth of the rack to within five ten-thousandths of an inch.

Figure 1B:
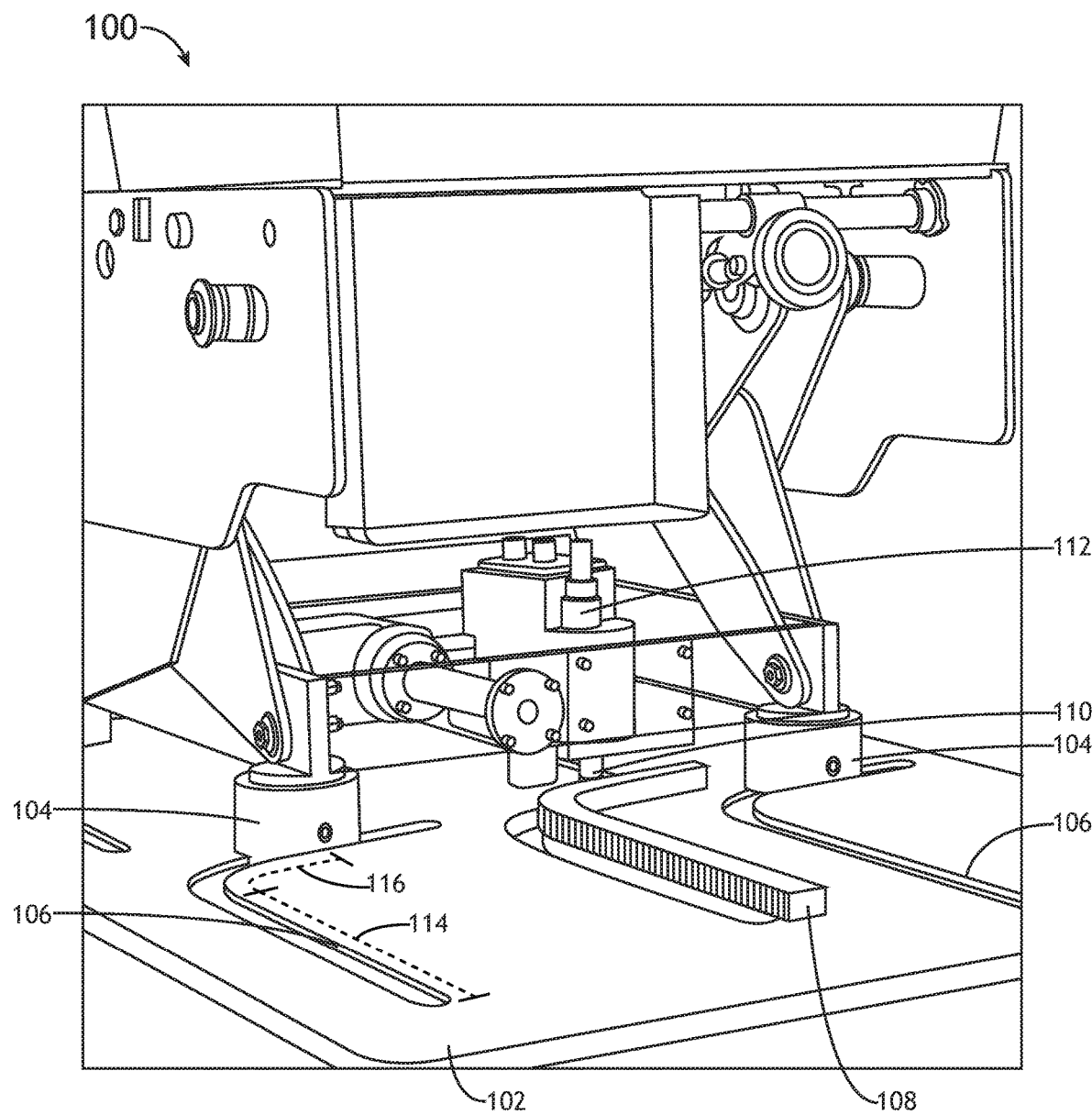
FIG. 1B shows a perspective environmental view of an aircraft seat assembly including a rack according to an exemplary embodiment.

Referring to FIGS. 1A-1B, perspective environmental views of an aircraft seat assembly 100 including a rack 108 according to an exemplary embodiment is shown. In some embodiments, it may be desirable for an aircraft seat assembly 100 to move relative to a corresponding base plate 102. The aircraft seat assembly 100 includes a plurality of base plate connecting elements 104 configured to translate along or within translation guide channels 106 defined by the base plate 102.

In at least one embodiment, the rack 108 is disposed on the base plate so that a pinion gear 110 driven by a motor 112 affixed to the seat assembly will engage the rack 108 and cause the aircraft seat assembly 100 to translate according to the shape of the translation guide channels 106. In at least one embodiment, it may be desirable for the aircraft seat assembly 100 to translate first in one direction, and then transition to translate in a different direction. In such embodiments, the translation guide channels 106 define a straight portion 114 and a curved portion 116. Likewise, the rack 108 may comprise corresponding straight portions and curved portions.

The size of the pinion gear 110 and thickness of the rack 108 are at least partially defined by the expected forces that will be applied to them. For example, to move the aircraft seat assembly 100 along the translation guide channels 106, the forces may dictate a relatively thick rack 108. Furthermore, the rack 108 and pinion gear 110 may be designed to relatively narrow tolerances for smooth operation and to prevent excessive wear from pinion gear 110 slipping with respect to the rack 108; and they may require relatively hard materials according to the expected life of the aircraft seat assembly 100.

Producing a rack 108 with the desired harness and thickness is challenging, especially if the rack 108 includes any deviations from a straight line. A billet of suitable material would be too thick and hard to die cut. Water jet cutting is possible, but water jets tend to produce an increasingly tapered cut beyond the topmost surface; such process is suitable for thin materials but a thick material cut by water jet into a rack 108 would have poorly defined teeth much below the topmost surface and therefore engage poorly with the pinion gear.

The only feasible methods for producing a suitable, solid rack 108 is a complicated, multi-step milling and machining process, or a complicated EDM process.

Figure 2A:
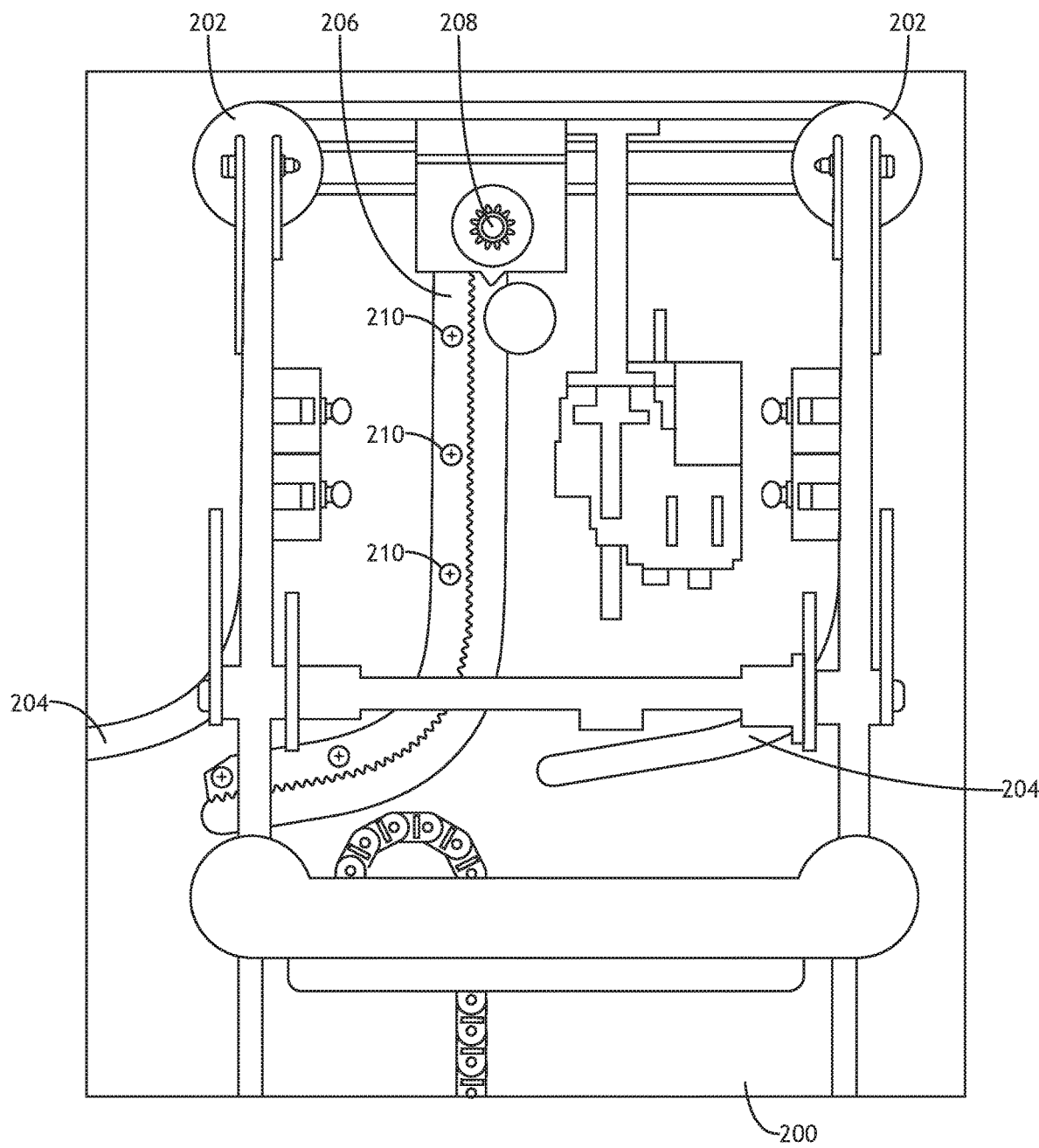
FIG. 2A shows a detail top environmental view of an aircraft seat assembly including a rack according to an exemplary embodiment.
Figure 2B:
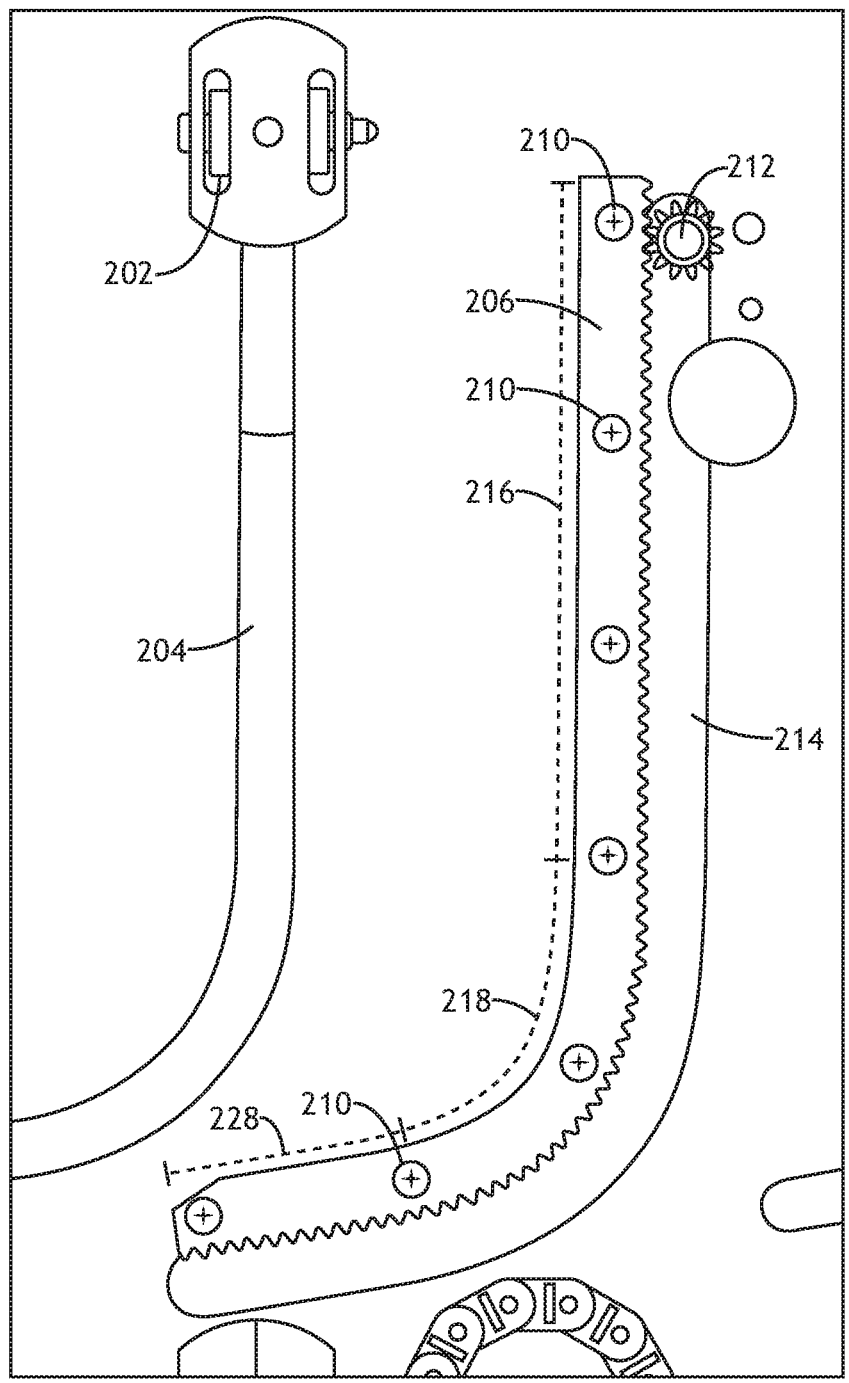
FIG. 2B shows a detail top environmental view of an aircraft seat assembly including a rack according to an exemplary embodiment.

Referring to FIGS. 2A-2B, detail top environmental views of an aircraft seat assembly including a rack 206 according to an exemplary embodiment are shown. Where the aircraft seat assembly includes a base plate 200 that defines a plurality of translation guide channels 204, base plate connecting elements 202 may engage the translation guide channels 204 to translate the aircraft seat assembly first linearly in a first direction, then through a smooth curve to transition to a linear motion in a second direction.

A motor 208 and corresponding pinion gear 212 drive the translation by engaging the rack 206 disposed on the base plate 200. In one embodiment, the rack 206 may be disposed proximal to a pinion gear channel 214. The pinion gear channel 214 may work in concert with the motor 208 to maintain engagement between the rack 206 and the pinion gear 212.

In at least one embodiment, the rack 206 comprises a continuous element having a first linear portion 216, a curved portion 218, and a second linear portion 220. The pinion gear channel 214 substantially conforms to the shape of the rack 206.

In at least one embodiment, the rack 206 defines a plurality of connection holes configured to receive fasteners 210 that affix the rack 206 to a desired location on the base plate 200. Furthermore, each connection hole may also comprise an alignment feature configured to align the teeth of a plurality of layers that combine to for the rack 206.

Figure 3:
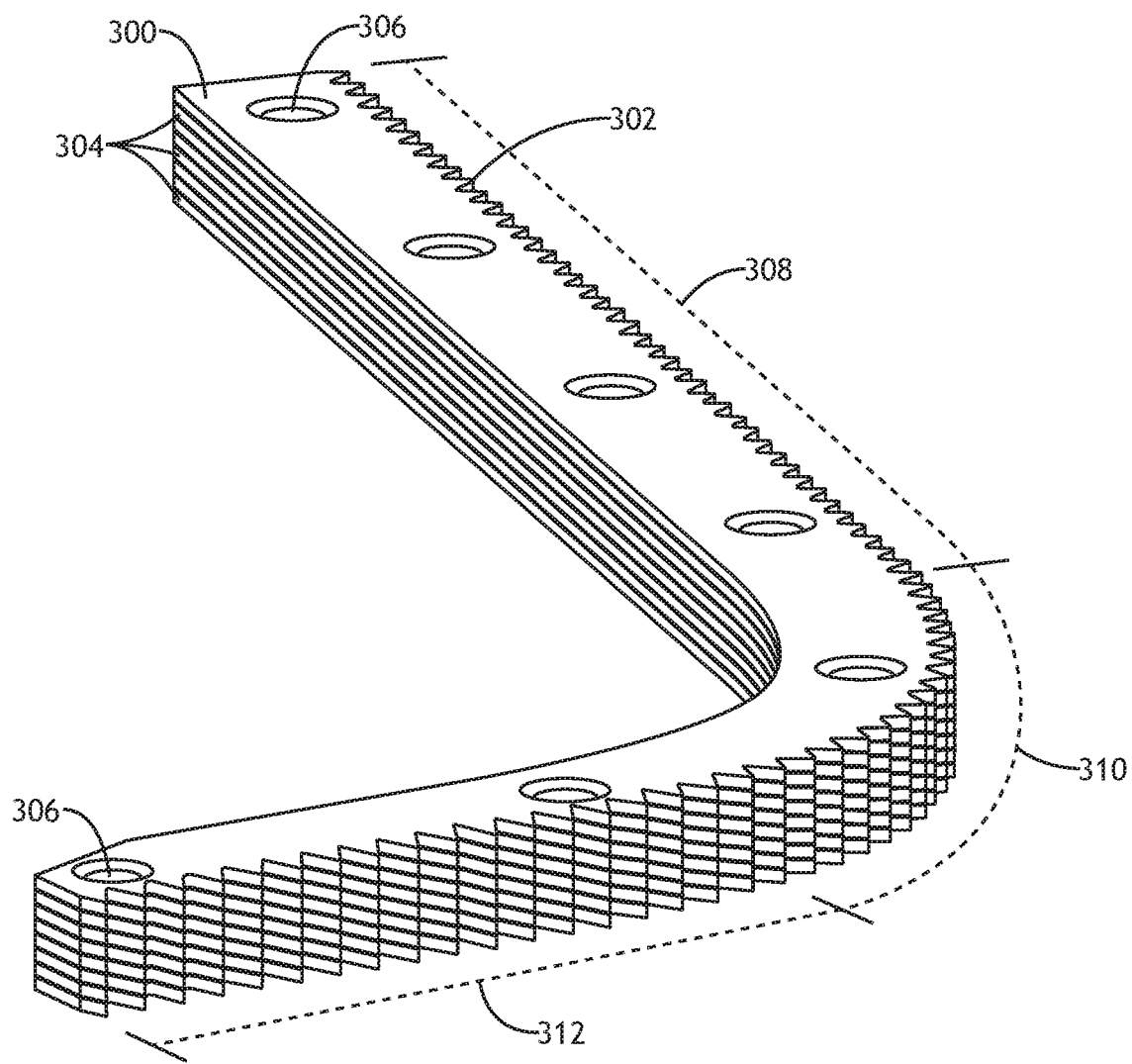
FIG. 3 shows a perspective view of a rack according to an exemplary embedment.

Referring to FIG. 3, a perspective view of a rack 300 according to an exemplary embedment is shown. The rack 300 is comprised of a plurality of layers 304, each defining teeth 302 configured to align with the other layers 304 within tight tolerances (for example, five ten-thousandths of an inch). Connection holes 306 defined by each layer 304 operate to properly align the layers 304 where a fastener inserts, and thereby align all the teeth 302. Misaligned teeth 302 are likely to cause tolerance issues with the corresponding pinion gear or get worn down over time.

In at least one embodiment, each of the layers 304 defines a first linear portion 308, a curved portion 310, and a second linear portion 312. The first linear portion 308, curved portion 310, and second linear portion 312 are continuous. A continuous rack 300 including curved portions 310 is difficult to manufacture in a single piece, requiring multiple milling and machining steps. Thin layers 304 may be die cut, laser cut, water jet cut, or other rapid manufacturing techniques. Such processes offer sufficient precision when applied to thin layers 304.

Figure 4:
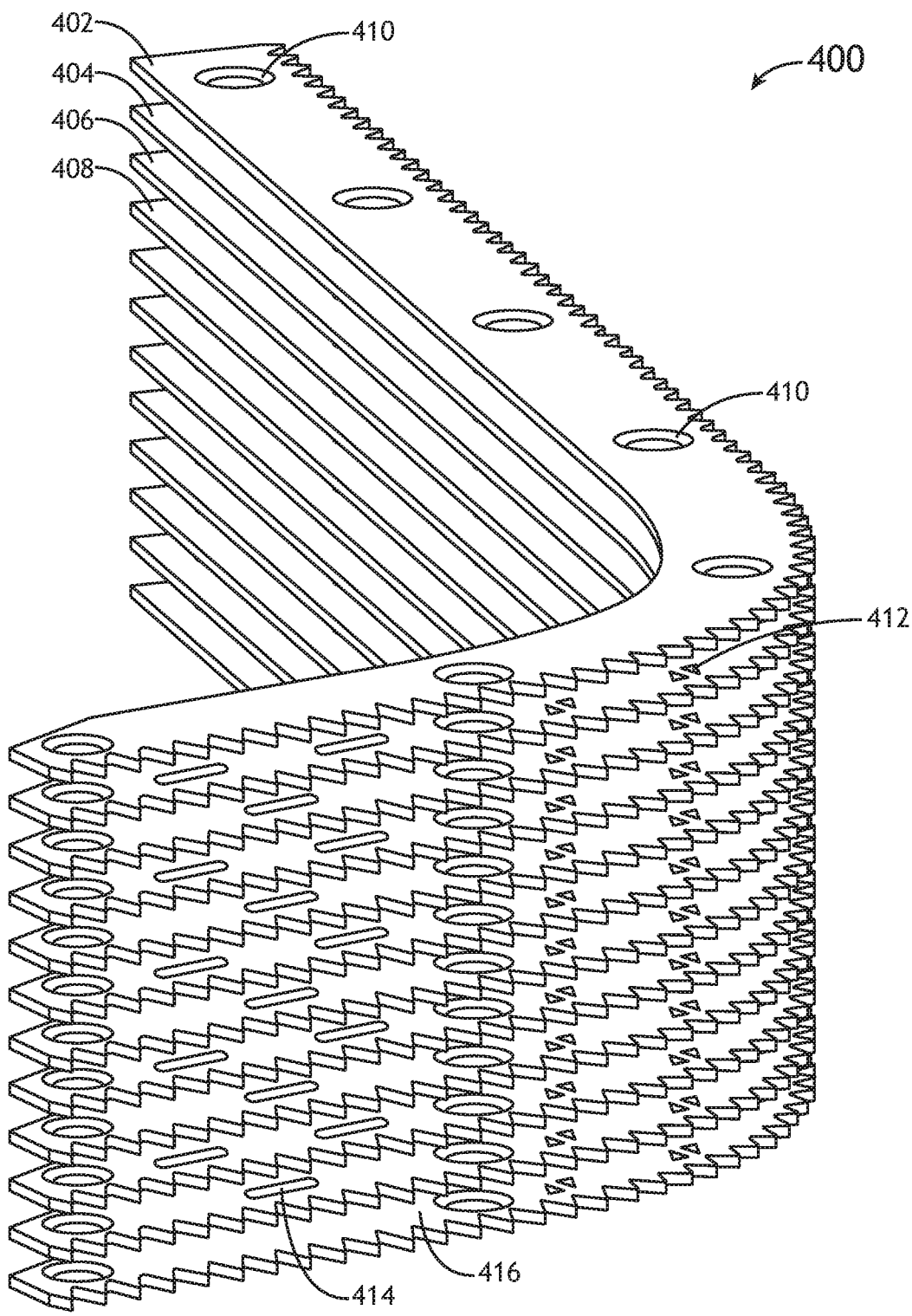
FIG. 4 shows an exploded perspective view of a rack according to an exemplary embedment.

Referring to FIG. 4, an exploded perspective view of a rack 400 according to an exemplary embedment is shown. The rack 400 comprises a plurality of layers 402, 404, 406, 408, 416, each aligned to each other via a plurality of connection holes 410.

In at least one embodiment, one or more of the layers 402, 404, 406, 408, 416 defines weight saving portions 412, 414 (sections cut from the layer to reduce weight without significantly compromising structural integrity). It may be appreciated that portions of each layer 402, 404, 406, 408, 416 proximal to each connection hole 410 may define the maximum strength of the layer based at least partially on the cross-sectional thickness of the remaining material. The weight saving portions 412, 414 may not reduce the cross-sectional thickness of the corresponding layer 402, 404, 406, 408, 416 below that threshold.

In at least one embodiment, where weight saving portions 412, 414 are defined by neighboring layers 402, 404, 406, 408, 416, the weight saving portions 412, 414 may be staggered such that they do not overlap, or only partially overlap, from one layer 402, 404, 406, 408, 416 to the next. It may be appreciated that weight saving portions 412, 414 may comprise, holes similar to the connection holes 410, slots 414 cut into the layer 402, 404, 406, 408, 416 during a water jet cutting process, or other substantially regular patterns 412. In at least one embodiment, exterior layers 402, 416 may be solid to prevent any contamination of the surfaces defined by the weight saving portions 412, 414.

In at least one embodiment, the layers 402, 404, 406, 408, 416 may comprise different material sets. For example, a first set of layers 402, 406, 416 may comprise hardened steel while a second set of layers 404, 408 comprise hardened aluminum. The sets of layers 402, 404, 406, 408, 416 are interleaved such that each hardened aluminum layer 404, 408 is disposed between hardened steel layers 402, 406, 416.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:
1. A rack for engaging a pinion gear, the rack comprising:
   a plurality of layers, each layer defining:
      at least a straight portion and a curved portion; and
      a plurality of teeth configured to align each of the plurality of layers, wherein:

each of the plurality of layers except for a topmost layer and a bottommost layer define weight saving portions comprising slots cut out of an interior of the layer; and the weight saving portions of neighboring layers in the plurality of layers do not overlap.

2. The rack of claim 1, wherein each of the plurality of layers further defines a plurality of alignment features configured to align the teeth of each layer to within five ten-thousandths of an inch.

3. The rack of claim 2, wherein each of the plurality of alignment features comprises a connection hole configured to receive a fastener to affix the plurality of layers to a base plate.

4. The rack of claim 1, wherein the weight saving portions are disposed a defined distance away from any of the alignment features.

5. The rack of claim 1, wherein:
the plurality of layers comprises a first set of layers comprising a first material and a second set of layers comprising a second material: and
the first set of layers and the second set of layers are interleaved.

6. An aircraft seat assembly comprising:
a base plate defining a plurality of tracks, each comprising at least a straight portion and a curved portion;
an aircraft seat having a plurality base plate engaging elements, each configured to engage a corresponding track;
a pinion gear driven by a motor connected to the aircraft seat; and
a rack for engaging the pinion gear disposed on the base plate, the rack comprising:
a plurality of layers, each layer defining:
at least a straight portion and a curved portion conforming to the straight portion and the curved portion of the base plate tracks; and
a plurality of teeth configured to align each of the plurality of layers,
wherein:
the pinion gear is configured to drive the rack and move the aircraft seat from a first orientation corresponding to the straight portion of the rack and base plate tracks to a second orientation corresponding to the curved portion of the rack and base plate tracks;
each of the plurality of layers except for a topmost layer and a bottommost layer define weight saving portions comprising slots cut out of an interior of the layer; and
the weight saving portions of neighboring layers in the plurality of layers do not overlap.

7. The aircraft seat assembly of claim 6, wherein each of the plurality of layers further defines a plurality of connection holes configured to receive a fastener to affix the plurality of layers to the base plate and align the teeth of each layer to within five ten-thousandths of an inch.

8. The aircraft seat assembly of claim 6, wherein the weight saving portions are disposed a defined distance away from any of the connection holes.

9. The aircraft seat assembly of claim 6, wherein:
the plurality of layers comprises a first set of layers comprising a first material and a second set of layers comprising a second material: and
the first set of layers and the second set of layers are interleaved.

10. The aircraft seat assembly of claim 9, wherein:
the first set of layers comprises steel; and
the second set of layers comprises aluminum.

* * * * *